(12) United States Patent
Larussa

(10) Patent No.: US 6,318,868 B1
(45) Date of Patent: Nov. 20, 2001

(54) INTERACTIVE VIRTUAL IMAGE STORE WINDOW

(76) Inventor: Joseph A. Larussa, 451 Rutledge Dr., Yorktown Heights, NY (US) 10598

( * ) Notice: Subject to any disclaimer, the term of this patent is extended or adjusted under 35 U.S.C. 154(b) by 0 days.

(21) Appl. No.: 09/411,451

(22) Filed: Oct. 1, 1999

Related U.S. Application Data

(63) Continuation of application No. 08/908,218, filed on Aug. 7, 1997
(60) Provisional application No. 60/045,311, filed on May 1, 1997.

(51) Int. Cl.$^7$ ....................................................... G02B 5/08
(52) U.S. Cl. ........................ 359/857; 359/630; 359/633; 359/864
(58) Field of Search .................................... 359/838, 864, 359/839, 857, 609, 629, 630, 631, 633, 479; 345/7; 434/76; 40/409, 411, 548, 560; 353/28

(56) References Cited

U.S. PATENT DOCUMENTS

| | | |
|---|---|---|
| Re. 27,356 | 5/1972 | La Russa . |
| 922,722 | 5/1909 | Salle . |
| 995,607 | 6/1911 | Kempinski . |
| 1,044,715 | 11/1912 | Wearn . |
| 1,699,689 | 1/1929 | Curry . |
| 2,112,314 | 3/1938 | Spandau . |
| 2,210,806 | 8/1940 | Etbauer . |
| 2,215,396 | 9/1940 | Hoyt . |
| 2,232,547 | 2/1941 | Mathias . |
| 2,285,509 | 6/1942 | Goshaw . |
| 2,490,747 | 12/1949 | Creighton . |
| 2,576,147 | 11/1951 | Sauvage . |
| 2,628,533 | 2/1953 | Oetjen . |
| 2,679,188 | 5/1954 | Gould . |
| 2,975,415 | 3/1961 | Klasens . |
| 3,036,154 | 5/1962 | Harman . |
| 3,048,654 | 8/1962 | Schade . |
| 3,096,389 | 7/1963 | Dudley . |

(List continued on next page.)

FOREIGN PATENT DOCUMENTS

| | | |
|---|---|---|
| 679342 | 1/1992 | (CH) . |
| 747917 | 3/1944 | (DE) . |
| 1154711 | 9/1963 | (DE) . |
| 0309630 | 4/1989 | (EP) . |
| 0310721 | 4/1989 | (EP) . |
| 0363206 | 4/1990 | (EP) . |
| 0460873 | 12/1991 | (EP) . |
| 1321303 | 6/1973 | (GB) . |
| 1543616 | 4/1979 | (GB) . |
| 2062281 | 5/1981 | (GB) . |
| 2072874 | 10/1981 | (GB) . |
| 2131645 | 6/1984 | (GB) . |
| 2134649 | 8/1984 | (GB) . |
| 2149090 | 6/1985 | (GB) . |
| 2177842 | 1/1987 | (GB) . |

(List continued on next page.)

(List continued on next page.)
(WO) .

Primary Examiner—Cassandra Spyrou
Assistant Examiner—Jared Treas
(74) Attorney, Agent, or Firm—Handal & Morofsky

(57) ABSTRACT

A display device for presenting a virtual image of a product. The device supports an object whose virtual image is to be presented at a point on one side of the device, and an optical system having a transparent member mounted in the manner of a conventional store window. The optical system projects an image of the object in virtual space towards an observer on the opposite side of said device. The device is also equipped with a means for directing an odor towards the image. The odor is scented according to the image being produced. The device is positioned adjacent to a place frequented by potential consumers of the product, such as a street in a shopping area of a town or mall.

7 Claims, 7 Drawing Sheets

U.S. PATENT DOCUMENTS

| | | |
|---|---|---|
| 3,293,983 | 12/1966 | Gaudyn . |
| 3,317,206 | 5/1967 | Holt . |
| 3,443,858 | 5/1969 | La Russa . |
| 3,508,809 | 4/1970 | Wilder et al. . |
| 3,572,893 | 3/1971 | Bennett et al. . |
| 3,632,108 | 1/1972 | Wilson . |
| 3,647,284 | 3/1972 | Elings et al. . |
| 3,661,385 | 5/1972 | Schneider . |
| 3,893,754 | 7/1975 | McInally . |
| 4,073,569 | 2/1978 | Rizzo . |
| 4,093,347 | 6/1978 | La Russa . |
| 4,094,501 | 6/1978 | Burnett . |
| 4,164,823 | 8/1979 | Marsico . |
| 4,183,644 | 1/1980 | Tureck et al. . |
| 4,210,928 | 7/1980 | Ohmori et al. . |
| 4,229,761 | 10/1980 | Thomas . |
| 4,232,968 | 11/1980 | Kempf . |
| 4,239,342 | 12/1980 | Aurin et al. . |
| 4,281,353 | 7/1981 | Scarborough, Jr. . |
| 4,283,115 | 8/1981 | Fraissl . |
| 4,315,281 | 2/1982 | Fajans . |
| 4,322,743 | 3/1982 | Rickert . |
| 4,357,075 | 11/1982 | Hunter . |
| 4,443,058 | 4/1984 | Bosserman . |
| 4,491,872 | 1/1985 | Boldt et al. . |
| 4,509,837 | 4/1985 | Kassies . |
| 4,535,354 | 8/1985 | Rickert . |
| 4,550,978 | 11/1985 | Friedle . |
| 4,556,913 | 12/1985 | Van Breemen et al. . |
| 4,571,041 | 2/1986 | Gaudyn . |
| 4,623,223 | 11/1986 | Kempf . |
| 4,647,966 | 3/1987 | Phillips et al. . |
| 4,649,425 | 3/1987 | Pund . |
| 4,653,875 | 3/1987 | Hines . |
| 4,671,625 | 6/1987 | Noble . |
| 4,683,467 | 7/1987 | Macaulay et al. . |
| 4,692,878 | 9/1987 | Ciongoli . |
| 4,702,603 | 10/1987 | Augustyn . |
| 4,717,248 | 1/1988 | La Russa . |
| 4,756,601 | 7/1988 | Schroder . |
| 4,776,118 | 10/1988 | Mizuno . |
| 4,802,750 | 2/1989 | Welck . |
| 4,805,895 | 2/1989 | Rogers . |
| 4,840,455 | 6/1989 | Kempf . |
| 4,927,238 | 5/1990 | Green et al. . |
| 4,961,626 | 10/1990 | Fournier, Jr. et al. . |
| 4,971,312 | 11/1990 | Weinreich . |
| 4,995,719 | 2/1991 | Shanks . |
| 5,004,331 | 4/1991 | Haseltine et al. . |
| 5,036,512 | 7/1991 | Cloonan et al. . |
| 5,065,116 | 11/1991 | Ueda et al. . |
| 5,076,674 | 12/1991 | Lynam . |
| 5,090,789 | 2/1992 | Crabtree . |
| 5,114,226 | 5/1992 | Goodwin et al. . |
| 5,144,482 | 9/1992 | Gould . |
| 5,148,310 | 9/1992 | Batchko . |
| 5,155,554 | 10/1992 | Schnable et al. . |
| 5,172,266 | 12/1992 | Garcia et al. . |
| 5,187,597 | 2/1993 | Kato et al. . |
| 5,189,452 | 2/1993 | Hodson et al. . |
| 5,257,130 | 10/1993 | Monroe . |
| 5,311,335 | 5/1994 | Crabtree . |
| 5,311,357 | 5/1994 | Summer et al. . |
| 5,408,346 | 4/1995 | Trissel et al. . |
| 5,486,840 | 1/1996 | Borrego et al. . |
| 5,552,934 | 9/1996 | Prince . |
| 5,572,375 | 11/1996 | Crabtree . |
| 5,580,140 | 12/1996 | Katz et al. . |
| 5,585,946 * | 12/1996 | Chern ........................................ 349/5 |
| 5,606,458 | 2/1997 | Fergason . |
| 5,621,572 | 4/1997 | Fergason . |
| 5,943,171 * | 8/1999 | Budd et al. .......................... 359/631 |

FOREIGN PATENT DOCUMENTS

| | | |
|---|---|---|
| WO8303019 | 9/1983 | (WO) . |
| WO8909423 | 10/1989 | (WO) . |
| WO9005944 | 5/1990 | (WO) . |
| WO9312455 | 6/1993 | (WO) . |
| WO 9519584 | 7/1995 | |

* cited by examiner

INTERACTIVE VIRTUAL IMAGE STORE WINDOW

This application is a continuation of Ser. No. 08/908,218 file Aug. 7, 1997 and claims benefit of Prov. No. 60/045,311 filed May 1, 1997.

TECHNICAL FIELD

The present invention relates to an apparatus, useful as a store window or other commercial display, for displaying a three-dimensional image at any position relative to what appears to be a pane of glass, and may also include a background and/or a nasal/olfactory stimulus related to the three dimensional image.

BACKGROUND

Over the years, the structural characteristics of in-store and streetside product displays have remained essentially unchanged. Generally, store window displays comprise an arrangement of the products being offered, together with sometimes whimsical decorations or other supplemental display materials. Such store window presentations are often put together by professional artists that specialize in such work, and, once decorated, a store window is likely to remain unchanged for an entire selling season, or longer. This is on account of the high cost of hiring such a store window decoration specialist.

Accordingly, a store window does not change in response to the different things which may be experienced during a selling season. Likewise, such store windows cannot change in response to the desires of persons passing by the store. Similarly, the display in a store window cannot change over time as a person is viewing the display. Accordingly, once the display is seen by the person looking in the store window and studied for the period of time which the person wishes to devote to the store display, the person's attention will the terminated and he or she will turn their attention to something else. In accordance with the invention, means are provided for varying the display with time in order to maintain viewer interest in a store display.

In addition, the store window display remains static and unchanged throughout the entire day and night, and regardless of whether the store is open or closed.

The above observations with respect to the inadequacies of store displays in the context of store windows apply equally as well to other commercial displays in stores, such as menus at fast food restaurants, tables with arrangements of goods on them, and the like.

Still another disadvantage of such prior art displays is the fact that the display is limited to the actual size of the goods if one desires to present a three dimensional representation of the particular product available for sale. While, in principle, large statues of products have been used commercially, the high cost of such models or sculpture is prohibitive and the same are, in the commercial retail sales context, extremely unusual.

Nevertheless, the value of such large displays has been known for some time.

For example, a small frozen custard vendor of the 1950's built a very large franchise based upon his stands which sported larger than life roof-borne ornaments consisting of an ice cream cone with a swirling structure simulating frozen custard above it.

In accordance with the invention, the above inadequacies of the prior art are avoided. In particular, the present invention provides means for the display of numerous three dimensional objects and associated background material in a larger than life context. Moreover, the system of the present invention may be employed to selectively present one of a number of objects to a viewer. The displayed object may be varied in order to maintain viewer interest. At the same time that this is achieved, the image of the objects is placed in close proximity to a viewer, allowing minute examination of details even at a distance.

In accordance with the invention, the above is achieved through the use on a store window pane comprising an optical member which blocks all direct transmission of light from an object on display behind the pane, while projecting an image of the object on display at a position in front of the store window. The objects may be portrayed as life size, or larger with appropriate background, lighting and the like, while at the same time, on account of the blocking of the direct light, selective presentation of a number of objects is possible in virtual space either in sequence or beside one another.

In accordance with the present invention, means are provided for projecting the image of a model or an actual object for viewing by an observer. The object to be used is placed on one side of what appears to be an ordinary window. All direct light from the object is blocked by the optical characteristics of the window. Instead, light from the object is collected and focused to form a virtual image in space having a desired magnification and position determined by the optics of the window, as more fully appears in the specification below.

Thus, in accordance with the invention, a perfume bottle may be suspended on one side of a window, while the observer is positioned on the other side of the inventive window. The perfume bottle is caused to appear, in accordance with the preferred embodiment of the invention, as a three dimensional image, in front of the window with a desired degree of magnification. Thus, the image of the perfume bottle appears to be suspended in space in front of the window.

The invention provides a dynamic three dimensional full color image in space of any item or items for advertising with a combined remote background so that proper parallax is obtained between the wanted image and the background thereby enhancing the realism and the three dimensional quality. The same is achieved using sandwiched structures such as that those in my earlier U.S. Pat. No. 3,443,858, 3,940,203, 4,163,542 and 4,708,438.

SUMMARY OF THE INVENTION

In this inventive design, the optical system is much simpler and much less costly, as compared to prior art systems, due to the use of spherical mirrors rather than the conventional parabolic mirrors. A second inventive feature is that the present invention not only utilizes the human audio and visual senses but also addresses the sense of smell because the human olfactory nerves provide inputs into the brain that are an important factor in determining whether an observer will accept or reject a three dimensional visual presentation as being real.

This is especially true in the areas of food or perfume or other items that exude strong stimuli. As an example of the use of such stimuli, the invention can be used to provide an aerial image with background where the food advertised such as a hamburger, or steak with onions or fries, approaches the viewer in space, together with a mechanically propelled scent associated with the food displayed.

The inclusion of a background is a matter of choice and may, in the above example, advertise the cost of the meal. The desirable odor is propelled to surround and emanate from the aerial image. Such a presentation is readily achieved with pressurized air saturated with the odor desired and propelled to a desired observer at a range of distances.

In addition, such display may be made to sequentially display different things. Such a sequential display of this type can be programmed to provide a number of the items on the menu of a restaurant or a fast food establishments and synchronize their display to the projection of corresponding smells.

In accordance with the preferred embodiment of the invention, and particularly in the case where the displays are used outdoors, the scent should be propelled by a vortex generator to prevent dispersion of the scent in the air by wind before the scent reaches the desired location in space e.g. surrounding and in front of the image in space.

A second example of the use of this invention is a perfume sampler display in department stores or cosmetic shops. Here, a model consisting of an arrangement in the form of a matrix of all available perfumes in their bottles is the source for the image of a particular perfume bottle to be projected as an aerial image in space, selective lighting or other means may be used to select or emphasize one of the perfume bottles. Push buttons associated with the display are depressed by the shopper to select a particular perfume. Upon depressing the button for a desired scent, the flacon of that image would immediately light up after being illuminated by a spotlight, and/or approach the shopper enlarging as it does so and spraying a small amount of the scented fragrance towards the shopper. Such movement of the image can be achieved by movement of the selected flacon a distance determined by the optics.

Should the shopper want to smell the effect on his or her skin, means may also be provided for the shopper is instructed to place his or her wrist on an illuminated circle in space, also projected as a visual image below the image of the particular perfume bottle. When the hand is detected in that space, a sample of the perfume is directed at the wrist of the shopper.

It should be understood that the above examples do not define the limits of this invention since other applications will become apparent.

BRIEF DESCRIPTION OF THE DRAWINGS

One way of carrying out the invention is described in detail below with reference to drawings which illustrate a specific embodiment of the invention.

DETAILED DESCRIPTION OF THE PREFERRED EMBODIMENTS

Figure 1:
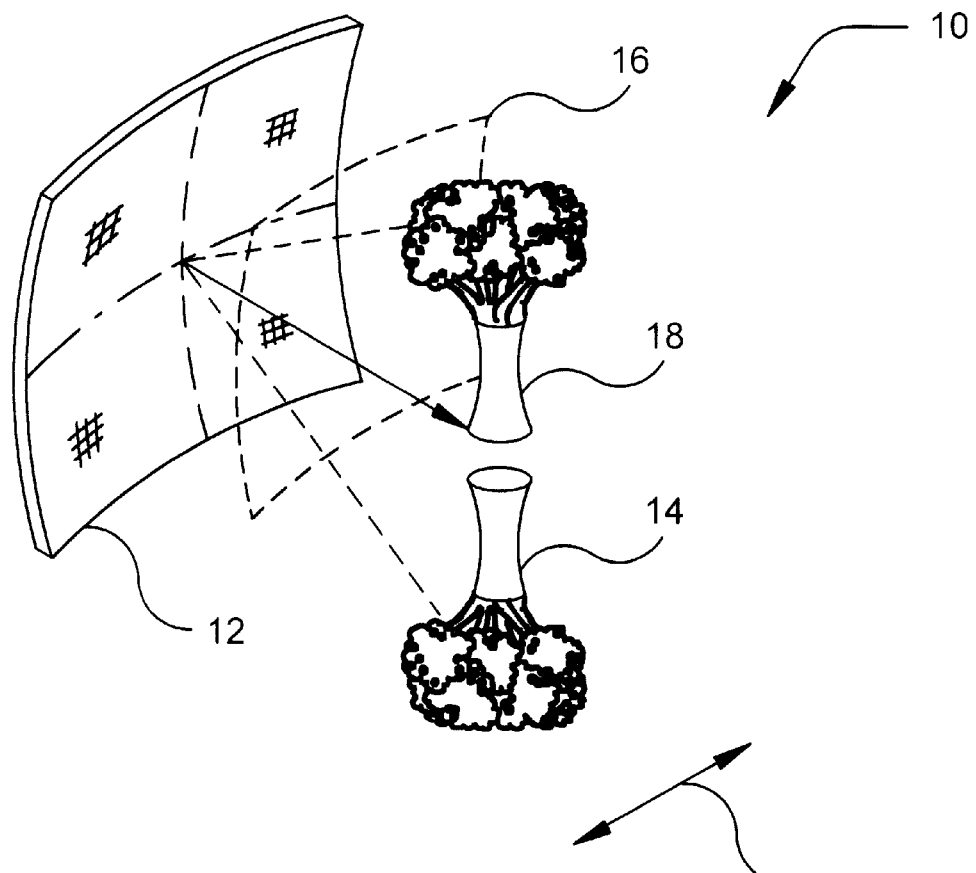
FIG. 1 is a perspective view illustrating an image producing optical system useful in a store window constructed in accordance with the present invention.

Referring now to FIG. 1, a virtual display system 10 is illustrated. Virtual display system 10 includes a spherical mirror 12. As an object 14 is positioned beyond the focal surface 16 of spherical mirror 12, an observer views an inverted three dimensional image 18.

In this configuration, as object 14 is positioned closer to spherical mirror 12 image 18 becomes larger in size. If object 14 is moved in the directions of arrow 20 the corresponding positioning of image 18 will also move.

Figure 2:
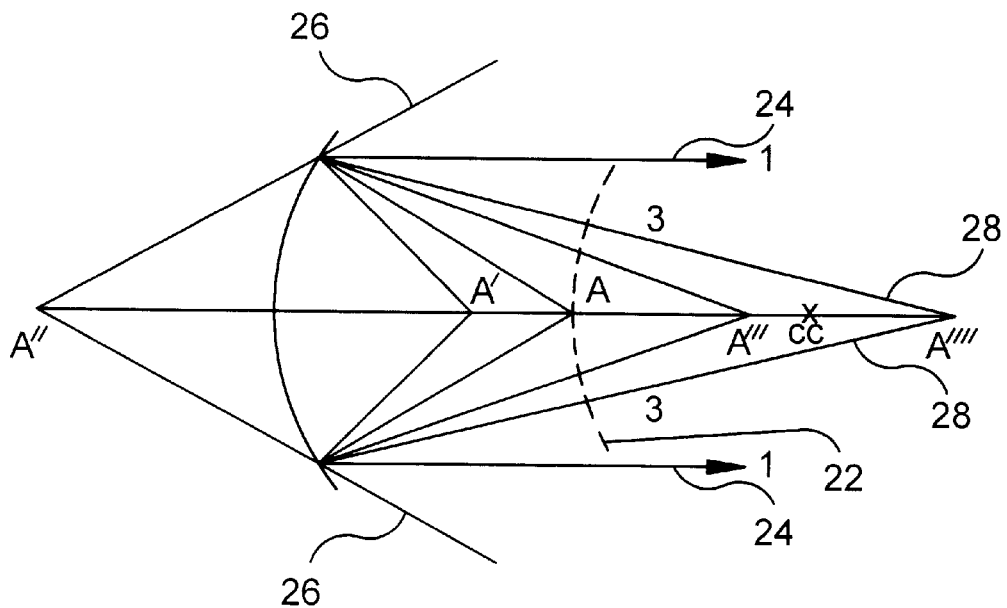
FIG. 2 illustrates the principles of the image size, position and proportional size configuration utilized by the the optics in the virtual display store window of the present invention.

As can be seen from FIG. 2, image 18 may be made to appear closer or further away from the observer in FIG. 1. This variation in distance can be stationary or by driving the object in or out. Thus, image 18 can be made to continuously approach or recede to the observer for dynamic effects. Light from point A, at the focal plane 22 of mirror 12, is reflected from mirror 12 as rays 24 which are parallel (collimated) thereby presenting an aerial image 18 of point A (or an object) at infinity. Moving object 14 to point A' will cause reflected rays 26 to converge and produce a virtual aerial image 18 at point A" closer to and on the other side of mirror 12, while moving the point to A'" will cause reflected rays 28 to produce image 18 at point A"".

Figure 3:
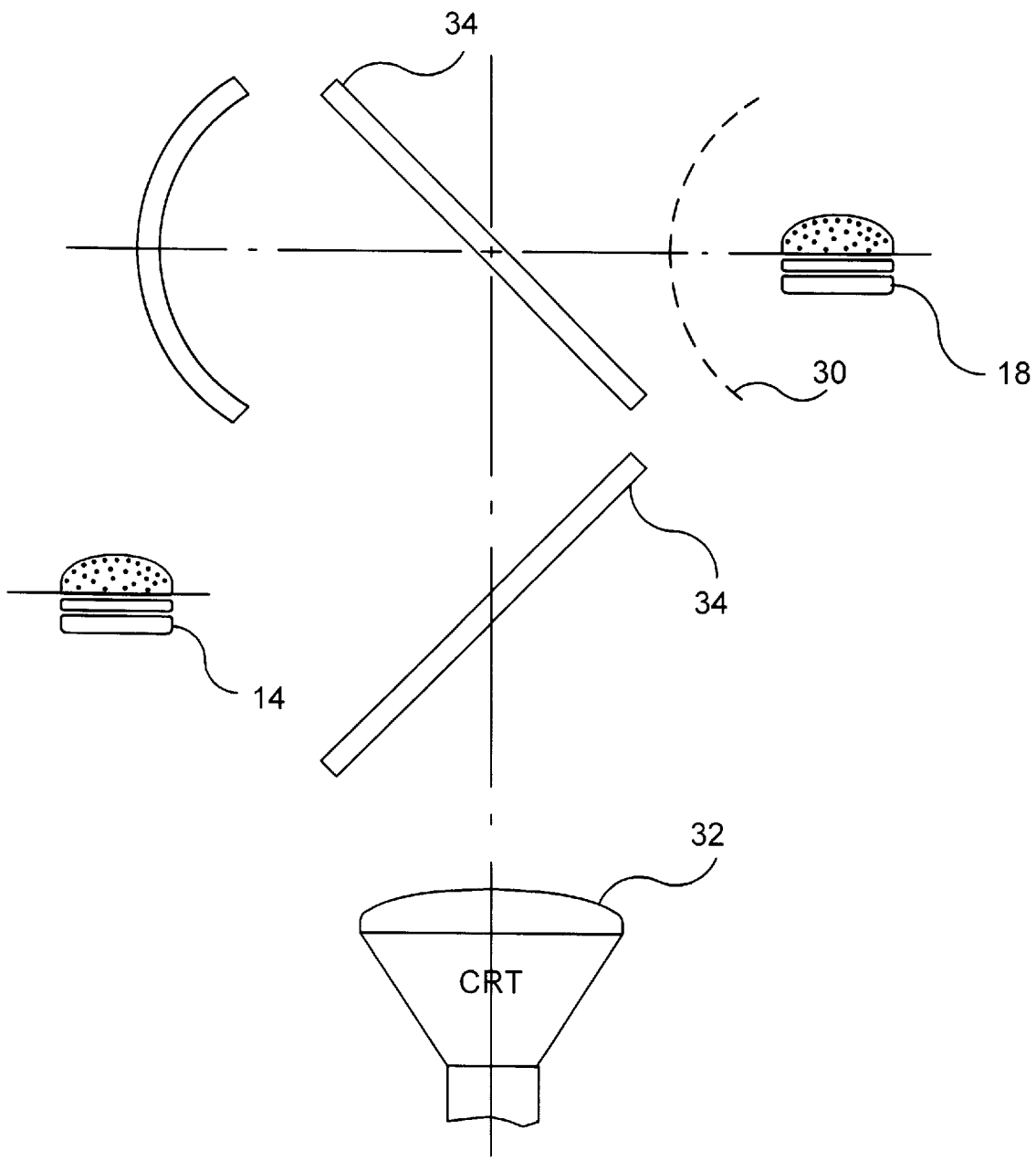
FIG. 3 illustrates an exploded schematic view of a portion of a virtual display system constructed in accordance with the present invention.

Turning now to FIG. 3, a composite scene 30 is generated to provide both image 18 and background image 32 against which image 18 can be viewed. Head motion of the observer generates motion parallax between image 18 and background image 32 which contributes to a true three dimensional image.

Positioning of both object 14 and composite scene 30 may be motor or servo control driven to provide a variable distance from the observer.

In addition, a pair of beam splitter mirrors 34 are positioned to provide an on-axis presentation. Object 12 and scene 30 are represented by two separate inputs and are servo driven thereby enhancing the three dimensional effect.

Thus, as an observer or a shopper approaches virtual image display 10, image 18 and scene 30 become illuminated or apparent. Alternatively, a motion sensor may be positioned to detect motions in front of virtual display system 10 and, response thereto, to illuminate image 18 and scene 30 as an individual approaches. In addition, this feature inay be replaced or used in conjunction with a direct connection to the illumination of the virtual display system by the user.

Figure 4:
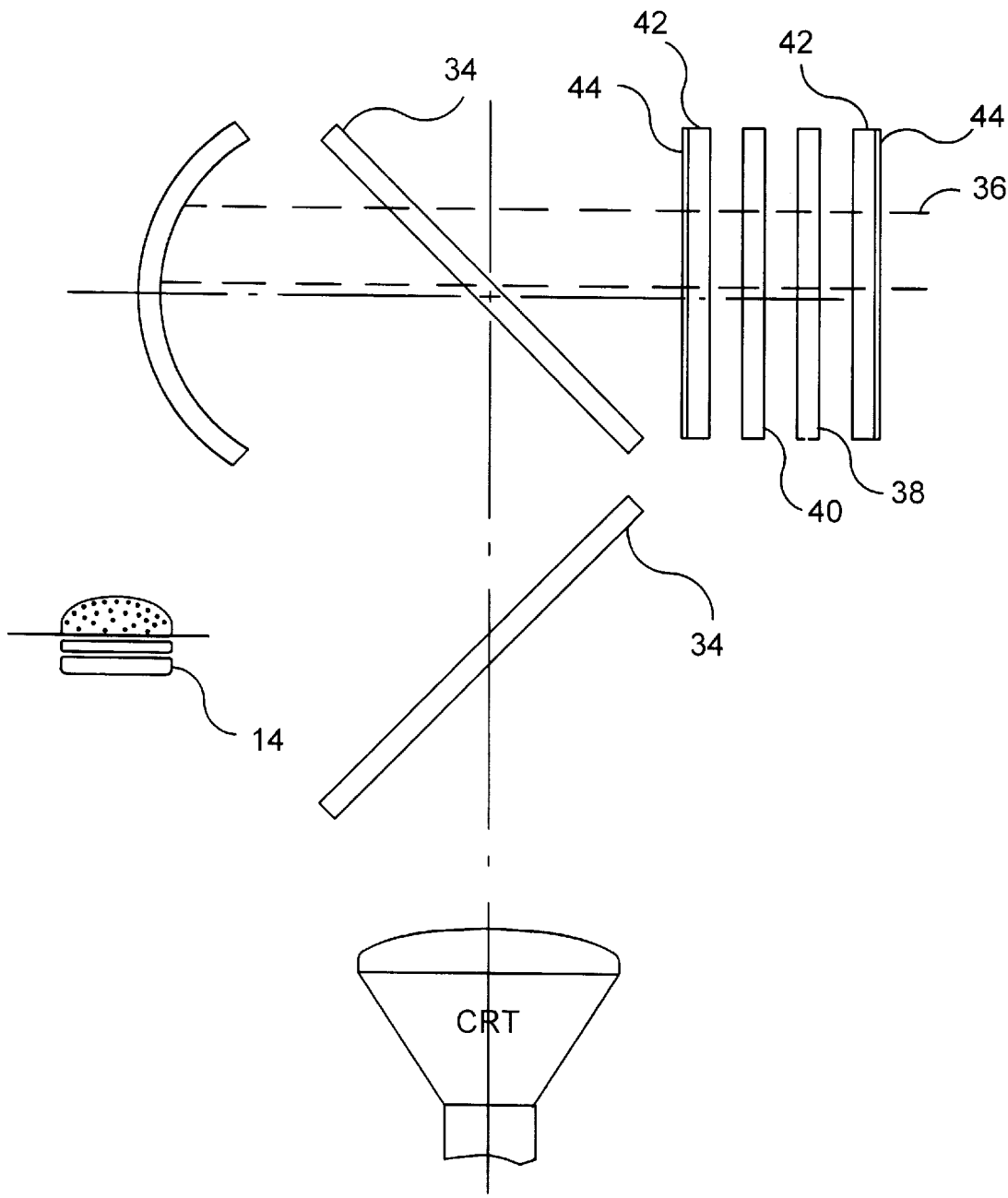
FIG. 4 illustrates an exploded view of a portion of the virtual display system constructed in accordance with the present invention.

Referring now to FIG. 4, unwanted background reflections that could reflect from beam splitters 34 or elsewhere and back to the observer are eliminated. Unwanted background illumination 36 passes through to spherical mirror 12 via a polarizer 38. Polarizer 38 has a vertical axis and polarizes background illumination 36 vertically. Background illumination 38 then passes through a quarter wave retarder or "quarter wave plate" 40 which rotates the plane of polarization of background illumination 36 so that when illumination 36 reflects off mirror 12 and passes through wave plate 40 again the reflected illumination 36 is rotated 90 degrees from its original position to a horizontally polarized light and is therefore prevented from passing through polarizer 38. This configuration prevents any unwanted light such as unwanted background illumination 36 from interfering with image 18.

In addition, a pair of end plates 42 having a broad-band anti reflection coating 44 are positioned not to reflect exterior light back to the observer so that no unwanted light interferes with the quality of image 18 viewed by the observer.

Moreover, end plates 42, polarizer 38 and quarter wave plate 40, can be cemented together and/or angularly positioned to be cemented to beam splitter 34.

As can be seen by the above discussion, it is possible to superimpose an image from a television monitor or other CRT device over a first image created using a model or an actual object. Obviously, the image may be scaled and positioned as desired, by proper positioning of object and optics, and the proper selection of the optical power for the focusing reflector. Likewise, it is possible to do the same for the image on the television monitor.

The effect of the use of a CRT or cathode ray tube to generate a luminous image to be displayed in superimposition with the image of the model or object 14 can be multiplied by having several inputs, CRT displays or monitors and using mirrors and half-silvered mirrors to cause all the images to enter the system and be visible to an observer. Indeed, the television image can be "rotated" in "space" using well-known computer drafting software to create a three dimensional view of the object as a two dimensional image as seen from any point in space.

In certain circumstances, the superposition of one image over another is not desirable. For example, if one wishes to project a background image using a television monitor, it should appear black where the image of the object is superimposed on it. Thus, a bottle of perfume, for example, would be superimposed on a field of flowers which incorporates a black silhouette of the bottle where the bottle image is to fit in the overall presentation of the perfume bottle and flower field image.

Such masking of an image is called occultation and can be achieved in a number of ways, such as generating a silhouette of the perfume bottle and using this as a blanking signal in the television monitor. Alternatively, and as a further refinement, the black silhouette may be moved to a different positions on the television monitor in order to accommodate the position of the observer. The position of the observer may be optically detected and electronically encoded to result in the proper registration between the occulation silhouette and the image of the product.

In accordance with the preferred embodiment, it is anticipated that the window will in many cases be made in whole or in part by sandwiched holographic members. While holographic members generally focus light at a single wavelength, full color is achievable in a multi-layered holographic sandwich of the type sold under the trademark PANCAKE WINDOW by the Farrand Optical Company Inc. previously of Valhalla, N.Y. In accordance with the preferred embodiment of the invention, such PANCAKE WINDOW may be made to incorporate three separate holographic mirrors each tuned to three different colors, namely red, blue and green, in order to achieve a full color presentation.

This may be achieved using new holographic materials that allow successive exposure, development and fixing of different color holographic mirrors in a single layer by successive exposure, development and fixing of each separate mirror individually. Another approach is the so-called film transfer method which allows the formation of a mirror in a planar film, which, in turn, is transferred to a spherical surface whose power the planar holographic mirror takes.

Figure 5:
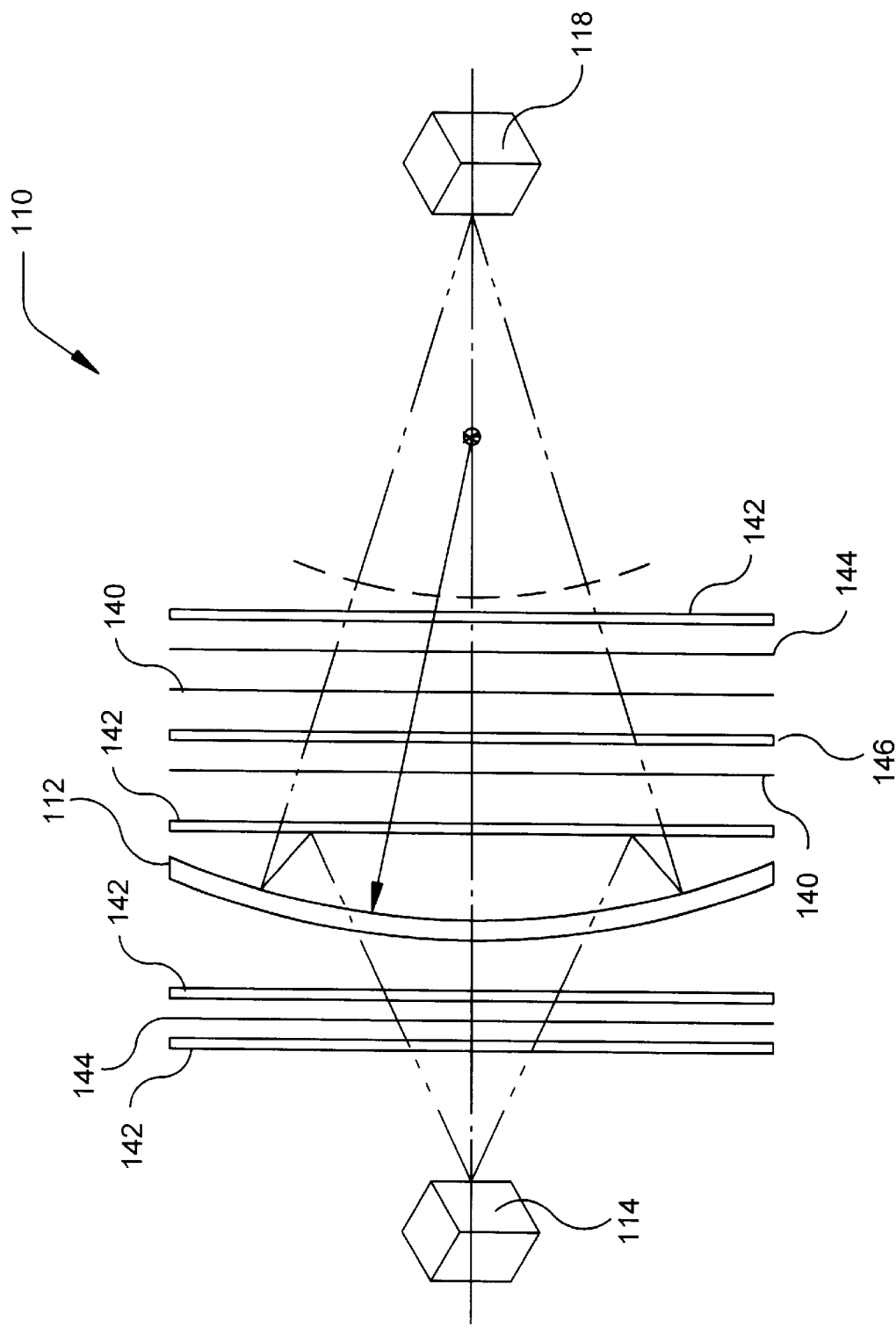
FIG. 5 illustrates an alternative embodiment of the virtual display system illustrated in FIG. 4.

Referring now to FIG. 5, an alternative embodiment of the present invention is illustrated. In this embodiment, components and/or parts performing analogous or similar functions are numbered in multiples of 100. Here a viewing device 110 constructed in accordance with the teachings of those defined in U.S. patent applications Ser. No. 3,443,858, 3,940,203 and 4,163,542 is shown.

An exploded of the viewing device 110, illustrates a spherical mirror beam splitter 112 which has a pair of end plates 142 and a polarizer 144 positioned on the convex side of spherical mirror 112.

At the concave side of spherical mirror 112, a second pair of end plates 142 are positioned on either side of a plane beam splitter 146. Also, positioned between end plates 142 and beam splitter 146 are a pair of quarter wave plate 140. A polarizer 144 is also positioned between quarter wave plate 140 furthest from mirror and end plate 142.

This positioning allows an image 118 to be projected in front of the pancake window 110 so that an observer may view image 118. In order to create such image 118, object 114 must be positioned at a distance greater than the focal plane location of spherical mirror 112. Alternatively, object 114 may be placed on the opposite side of PANCAKE WINDOW 110. In this configuration, image 118 is produced on the opposite side of PANCAKE WINDOW 110.

The detailed operation such as the on-axis displays and the tilted bi-refringent displays of the PANCAKE WINDOW wherein ghost images are eliminated, is clearly taught in the aforementioned patents. Device 110 can receive multiple inputs where a beam splitter is used to project one or more objects through device 110 and by varying the individual object distances, the objects will appear at varying distances each with parallax due to their separation. Device 110 will display true virtual images that are three dimensional.

Such features may be utilized in a computer operated display such as those used in a computer aided design (CAD) system wherein an actual volumetric view can be presented in space directly in front of the operator. Where the user can actually view the design in space.

Figure 6:
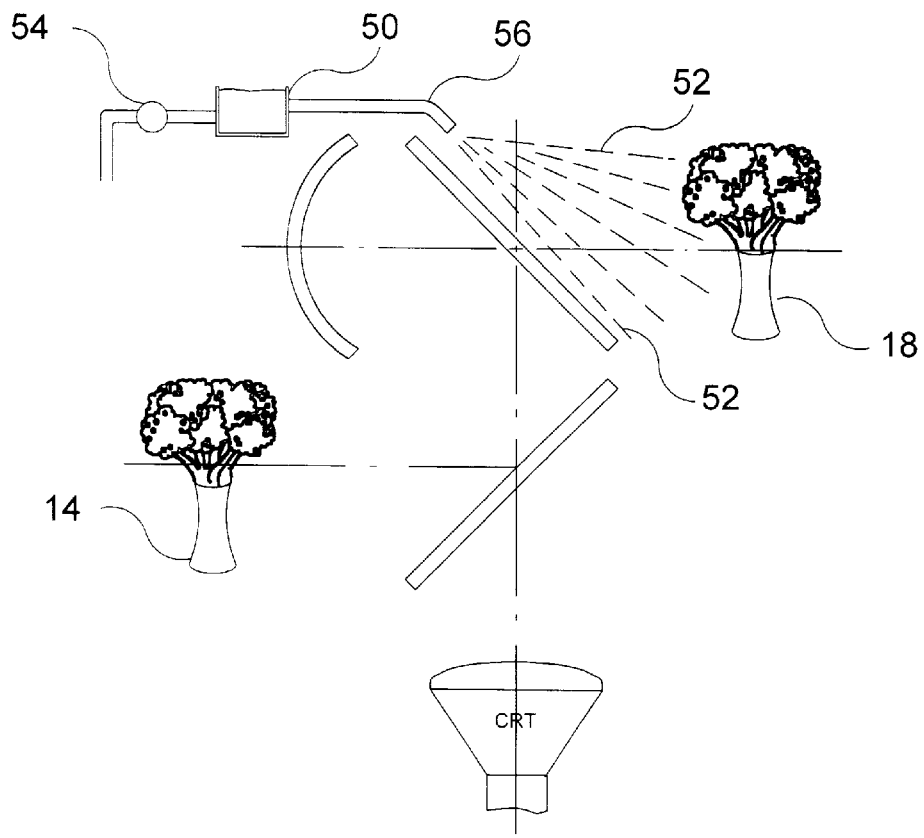
FIG. 6 illustrates the odor producing mechanism in accordance with present invention.

Referring now to FIG. 6, the odor producing feature of the present invention is illustrated. Here an odor producing chamber 50 contains a concentrated scent 52. Scent 52 is used to act on the olfactory nerves of the observer while at the same time the observer is visually stimulated. Scent 52 is adapted to match image 18 produced by virtual display system 10. Such as in the case of a hamburger image, scent 52 may correspond to the smell of a freshly cooked or cooling hamburger. Alternatively and as discussed above, scent 52 may correspond to a perfume image. Compressed air is introduced into chamber 50 via a one way input valve 54. Chamber 50 is also equipped with a nozzle 56. Nozzle 56 is positioned to direct scent 52 towards image 18. Accordingly, compressed air carries scent 52 towards image 18.

Figure 7:
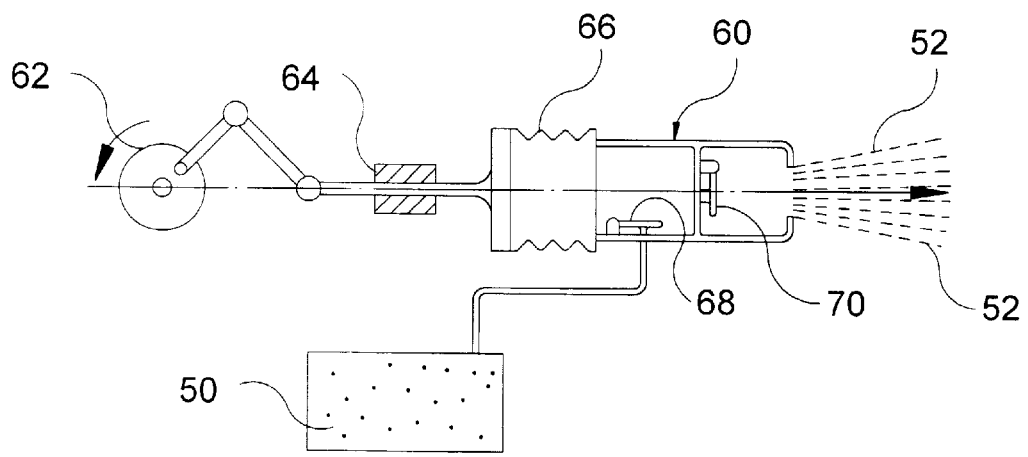
FIG. 7 illustrates the an alternative embodiment of the FIG. 6 embodiment.

Alternatively and as illustrated in FIG. 7, a vortex generating device 60 may be attached to odor supply chamber 50. In this configuration, a motor 62 operating in cooperation with a sleeve 64, a bellows 66, a one-way inlet valve 68 and a one-way exhaust valve 70 can project scent 52 towards image 18 and the observer. Vortex device 60 may be of particular importance when the virtual display system 10 is positioned in an outdoor environment whereby scent 52 may become easily dispersed.

Alternatively, vortex drive device 60 may be remotely activated by a sensor that picks up movement in front of virtual display system 10. In addition, this feature may be also activated by a observer/image interface. In this configuration an observer may be able to physically activate the dispersal of scent 52. Moreover, the virtual display system may offer a variety of images 18 and corresponding scents 52. Such a system may also be activated by the aforementioned features.

The aforementioned features are used in conjunction with the three dimensional imagery previously discussed to produce a three dimensional image that can vary in size, shape and position with respect to the separately produced and controlled imagery of the backdrop. Moreover, such imagery is used in conjunction with an odor producing device to affect both the visual and olfactory senses of a user. This feature is of particular importance in the marketing and advertisement fields whereby virtual display system 10 can be manipulated to produce a realistic image for a shopper to see and smell.

Moreover, virtual display system 10 can be adapted to interact with the observer varying the size, shape, position and smell of the image adding realistic aspects to the image being produced. In the same context virtual display system 10 can also be adapted to allow a user based interface.

Figure 8:
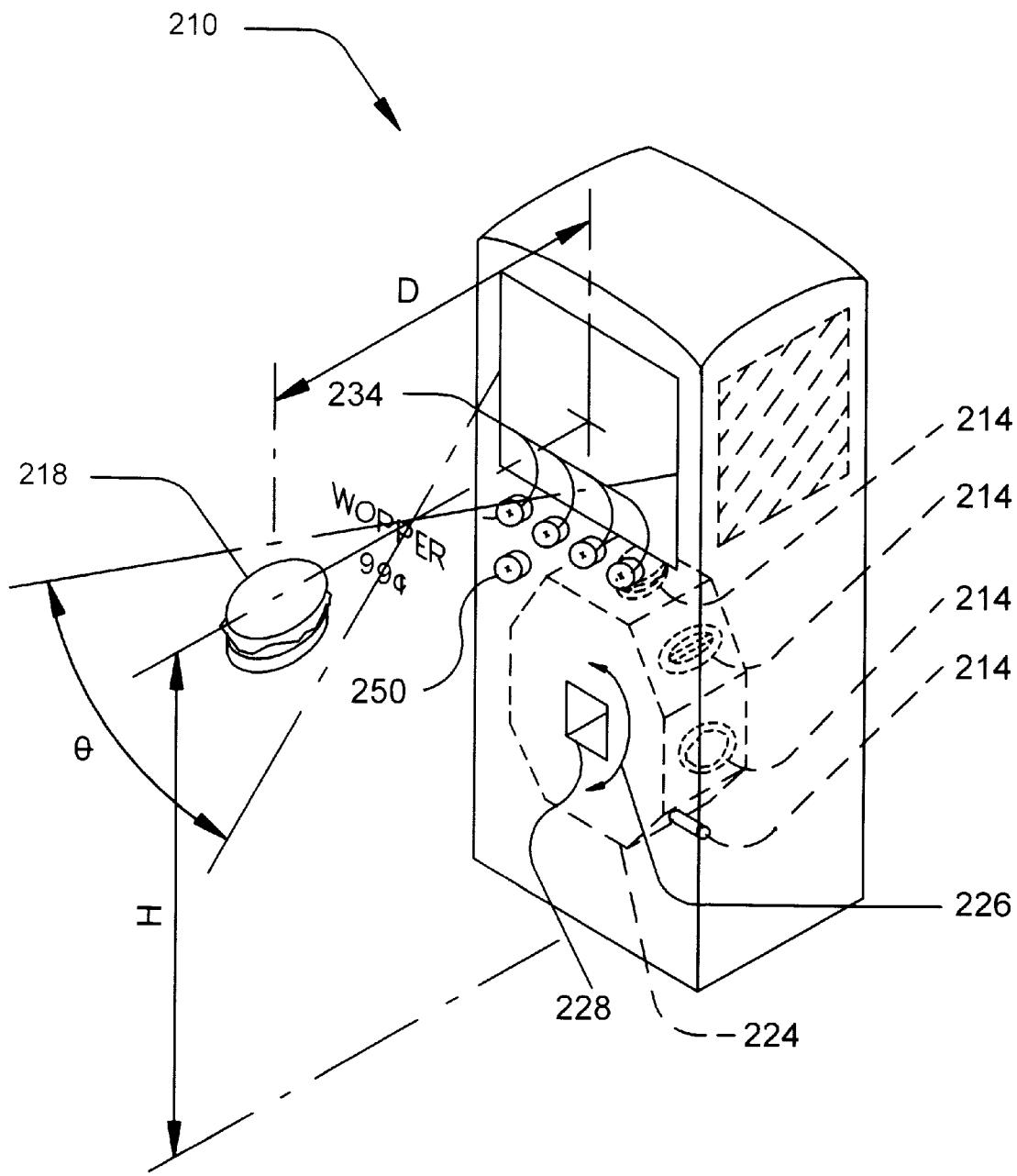
FIG. 8 is a view of a multiple item display.

Referring to FIG. 8, an another alternative embodiment of the present invention is illustrated. Here system 210 comprises a plurality of selectable objects 214, which in this embodiment comprise various food selections, such as a hamburger, a hot dog, fries, soft drink and the like.

Each of the objects is mounted on a drive wheel 224 for movement in the direction indicated by arrows 226. Drive wheel 224 is configured to hold multiple objects for display by system 210. Drive wheel 224 is actuated to move in the direction of arrows 226 by a motor 228.

Drive wheel 224 moves in the direction of arrows 226, as an automated signal is given to motor 228. Alternatively, motor 228 can be sequentially driven or can respond to an input signal received from a sensor 250. Sensor 250 is positioned on the surface of system 210 to indicate whether or not an individual is present before system 210.

Olfactory stimulation is provided by a plurality of scent jets 234 which are positioned on the surface of system 210. Scent jets 234 are also sequentially driven or can respond to an input signal received from sensor 250.

In yet another embodiment, the present system can be incorporated into a computer monitor wherein an image is projected in three dimensions out in space in front of the screen of the computer. In principle, it is even possible to project a pair of binocular images in space to create an image in full 3-D.

Figure 9:
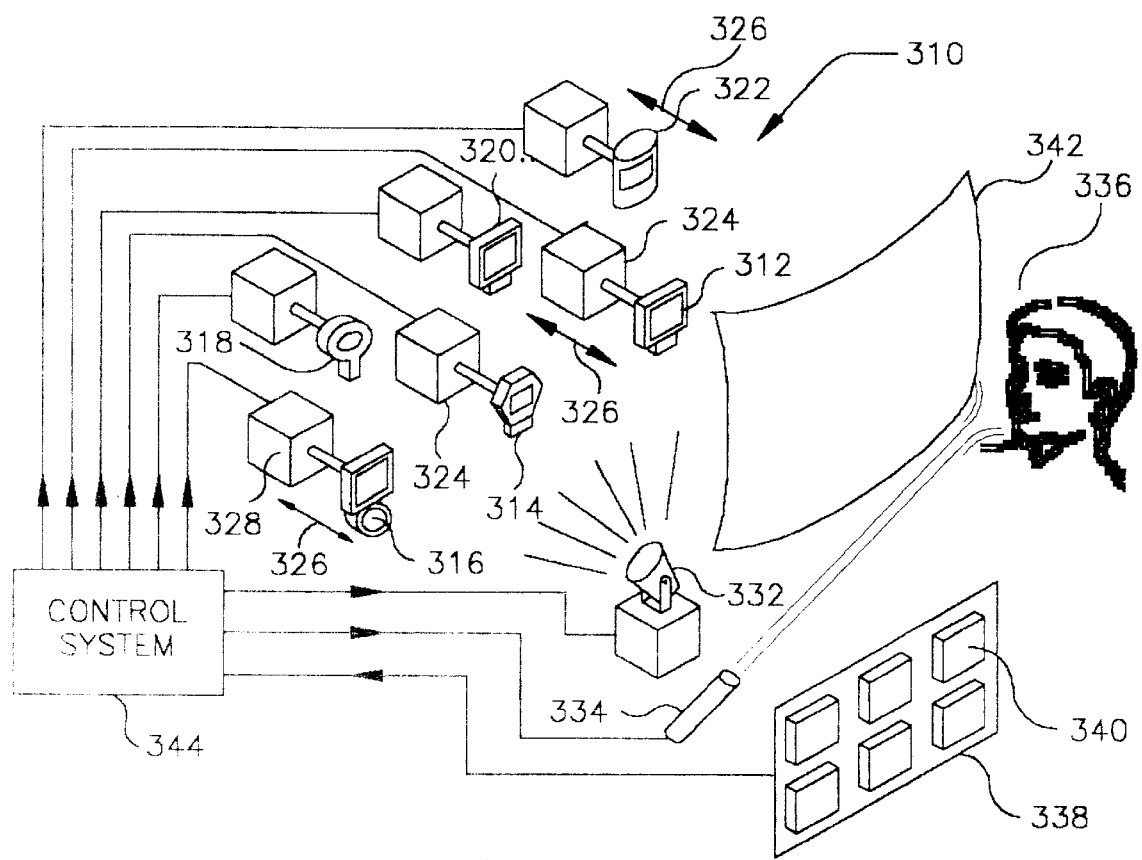
FIG. 9 is a view of the odor producing mechanism of the FIG. 8 embodiment.

Referring to FIG. 9, an another alternative embodiment of the present invention is illustrated. System 310 comprises a plurality of selectable models 312 through 322, which in this embodiment comprise actual bottles of perfume.

Generally, it is contemplated that. models 312 through 322 are located at the spatial focal plane of the optical system at a position which is, one-half the radius of the curvature of mirror 342. Models 312 through 322 may also be positioned to produce a corresponding image in accordance with the positioning of viewer 336.

Each of the models 312 through 322 is mounted on a respective arm 324 for movement in the direction indicated by arrows 326. Arms 324 are actuated to move in the direction of arrows 326 by their respective motors 328.

Likewise, selective lighting of one or more of the models 312 through 322 is achieved using a controllable spotlight system 332 illustrated schematically in FIG. 9. In accordance with the invention, system 332 may be controlled to selectively illuminate one or more of the models, or to illuminate one or more of the models typically in order to achieve a desired effect. Likewise, motors 328 may be actuated to achieve different effects, such as movement of a model, or in conjunction with auxiliary optics, enlargement of the image of the model.

Figure 10:
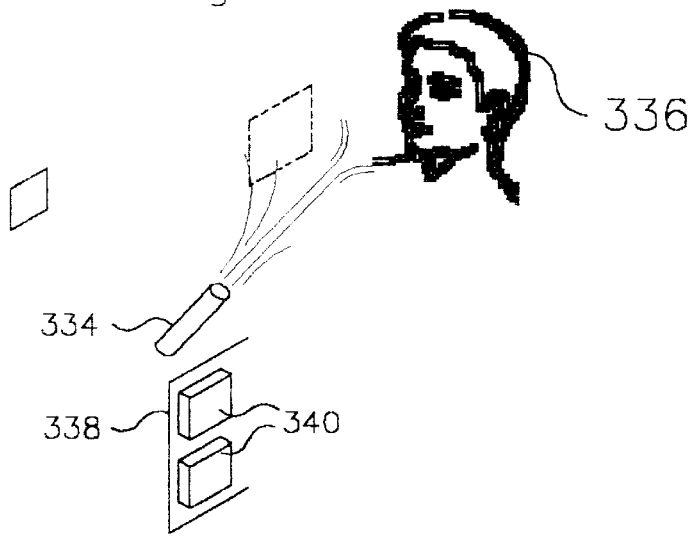
FIG. 10 is a view of an alternative multiple item display.

Olfactory stimulation is provided by a scent jet 334 which is positioned adjacent the display, as shown more clearly in FIG. 10. Control of the system is provided to a user 336 by a panel 338 which incorporates a plurality of buttons 340 allowing the user 336 to view the system through what appears to be an ordinary winidow 342, but which in fact operates as the focusing optics of the system as described above in connection to the embodiment of FIGS. 1 through 7.

In accordance with the embodiment of FIGS. 9 and 10, user input is provided from buttons 340 to a computerized control system 344 Which directs operation of spotlight system 332 (or other illumination source) and scent jet 334 and, if the same is required, also directs the movement of one of the models 312 through 322. It is also to be understood that computerized control system 344 may also be software driven and may, without user input, selectively show one product after another. Likewise, depending on the time of day or other factors, computerized control system 344 may direct the display of different products. For example, in the illustrated example of perfume bottles, the system may display informal, casual scents during the day, and more formal perfumes at night.

In accordance with the invention as illustrated in FIGS. 9 and 10, a number of advantages are provided over conventional store windows, whether they be on a conventional street or face the sidewalk of a mall. In this specification and the appended claims, the terms street, and sidewalk are used synonymously to cover the instance of a display open to the elements and other displays in protected environments such as malls, or within stores.

More particularly, the present invention not only provides a means to extend interest in the display as well as to vary the display for different times of the day or the week, but also to give it a relatively unique characteristic, thus dramatically increasing memorability. In particular, the addition of olfactory stimulus is a unique characteristic which increases the memorability of the store display as an advertising medium. In the case of materials and products where scent is an important product characteristic, yet another obvious advantage is achieved. Consider, for example, the case of food and perfumes. More subtle situations may be an outdoor smell associated with fishing equipment, or the like. The result is to bring to the mind of the person observing the sign a memory, likely a pleasurable one, and thus to again stimulate memorability, effectiveness and the ability of the display to attract attention.

While an illustrative embodiment of the invention has been described, various modifications will be obvious to those skilled in the art. Such modifications are within the spirit and scope of the present invention which is limited and defined only by the appended claims.

What is claimed is:

1. A virtual display system comprising:
a) a spherical mirror;
b) a first beam splitter disposed on the concave side of said mirror;
c) a first end plate positioned beyond said first beam splitter, said first end plate having a broad band anti reflection coating disposed on the side of said first end plate facing said first beam splitter;
d) a quarter wave plate positioned beyond said first end plate;
e) a polarizer positioned beyond said quarter wave plate, said polarizer being vertically polarized;
f) a second end plate positioned beyond said polarizer, said second end plate having a broad band anti reflection coating disposed on the side of said second end plate facing away from said polarizer; and
g) a second beam splitting plane mirror providing for separate inputs of an object and a backdrop for said object, said object and said backdrop having a variable distance from said virtual display system thereby varying the size and position of the images produces by said virtual display system.

2. A virtual display system as in claim 1, wherein a scent producing mechanism emits an odor producing scent corresponding to the image being displayed by said virtual display system.

3. A virtual display system as in claim 2, wherein a scent producing mechanism comprises:
i) a chamber having an input and an output and for holding said odor producing scent, said chamber emits said odor producing scent via compressed air supplied to said input via a one-way valve and exiting said chamber via said output
whereby said output is positioned to direct said scent at said image.

4. A display device for presenting a virtual image of a product, comprising:
(a) an optical system having a street side and being positioned with said street side adjacent to a place frequented by potential consumers, such as a street in a shopping area of a town or mall, said optical system comprising:
i) a concave mirror;
ii) a first beam splitter disposed on the concave side of said mirror;
iii) a first end plate positioned beyond said first beam splitter, said first end plate having a broad band anti reflection coatiog disposed on the side of said first end plate facing said first beam splitter;
iv) a quarter wave plate positioned beyond said first end plate; one the side of said first end plate facing said first beam splitter;
v) a polarize positioned beyond said quarter wave plate, said polarizer being vertically polarized;
vi) a second end plate positioned beyond said polarizer, said second end plate having a broad band anti reflection coating disposed on the side of said second end plate facing away from said polarizer; and
vii) a second beam splitting plane mirror providing for separate inputs of an object and a backdrop for said object, said object and said backdrop having a variable distance from said virtual display system thereby varying the size and position of the images produced by said virtual display system;
(b) an object whose image is to be presented; and
(c) a support supporting said object whose virtual image is to be presented at a point on the side of said optical system which is opposite the place frequented by potential consumers, said optical system being mounted in the manner of a conventional store window, said optical system projecting an image of said object in virtual space to an observer on said street side of said optical system.

5. A virtual display system for presenting a virtual image of a product, the display system comprising:
(a) an optical system having a street side and being positioned with said street side adjacent to a place frequented by potential consumers, said place optionally being a street, in a shopping area of a town or mall said optical system comprising:
(i) a generally spherical concave mirror, said concave mirror defining an optical axis passing substantially through the center of said generally spherical concave mirror and extending in a first direction transverse to said generally spherical concave mirror;
(ii) a beam splitter assembly comprising first and second beam splitters which fold the optical axis of the generally spherical concave mirror twice resulting in the optical axis extending along first, second and third directions, said object being located on the optical axis in said second direction, and further comprising an imaging device centered along the optical axis in said third direction, whereby said object and images on said imaging device may be seen simultaneously through said optical system;
(iii) a first end plate positioned beyond said first beam splitter, said first end plate having a broad band anti reflection coating disposed on the side of said first end plate facing said first beam splitter;
(iv) a quarter wave plate positioned on the side of said first end plate facing said first beam splitter;
(v) a polarizer positioned beyond said quarter wave plate;
wherein said optical system has an axis which extends in the same direction as said optical axis defined by said generally spherical concave mirror, and said object lies along said folded optical axis, whereby both said object and said optical system are on axis;
(b) an object whose image is to be presented; and
(c) a support supporting said object whose virtual image is to be presented at a point on the side of said optical system which is opposite the place frequented by potential consumers, said optical system being mounted in the manner of a conventional store window, said optical system projecting an image of said object in virtual space to an observer on said street side of said optical system.

6. A virtual display system as in claim 5, wherein said first beam splitter is positioned to reflect light from said concave spherical mirror downwardly, and said second beam splitter is positioned to receive light reflected by said first beam splitter and said object is positioned to receive light from said second beam splitter reflected by said first beam splitter, whereby light emitted by said object is reflected by said second beam splitter to said first beam splitter and then to said spherical mirror to form an image visible to persons in said place frequented by potential customers.

7. A display device for presenting a virtual image of a product comprising:
(a) an optical system having a street side and being positioned with said street side adjacent to a place frequented by potential consumers, such as a street in a shopping area of a town or mall;
(b) an object whose virtual image is to be presented; and
(c) means for supporting said object whose virtual image is to be presented at a point on the side of said optical system which is opposite the place frequented by potential consumers, said optical system being mounted in the manner of a conventional store window said optical system projecting an image of said object in virtual space to an observer on said street side of said optical system, said optical system comprising:

i) a concave mirror;
ii) a first beamsplitter disposed on the concave side of said mirror;
iii) a first end plate positioned beyond said first beam splitter, said first end plate having a broad band anti reflection coating disposed on the side of said first end plate facing said first beam splitter;
iv) a quarter wave plate positioned beyond said first end plate;
v) a polarizer positioned beyond said quarter wave plate; and
vi) a second end plate positioned beyond said polarizer, said second end plate having a broad band anti reflection coating disposed on the side of said second end plate facing away from said polarizer; and
vii) a second beam splitting plane mirror providing for separate inputs of an object and a backdrop for said object, said object and said backdrop having a variable distance from said virtual display system thereby varving the size and position of the images produced by said virtual display system.

* * * * *